May 16, 1939. P. ROBINSON ET AL Re. 21,088

ELECTROLYTIC DEVICE

Original Filed Sept. 10, 1934

PRESTON ROBINSON
& JOSEPH L. COLLINS
INVENTORS

BY Dorsey & Cole
ATTORNEYS

Reissued May 16, 1939

Re. 21,088

UNITED STATES PATENT OFFICE 21,088

ELECTROLYTIC DEVICE

Preston Robinson, Williamstown, and Joseph L. Collins, North Adams, Mass., assignors to Sprague Specialties Company, North Adams, Mass., a corporation of Massachusetts Original No. 2,122,393, dated June 28, 1938, Serial No. 743,469, September 10, 1934. Application for reissue October 4, 1938, Serial No. 233,338

5 Claims. (Cl. 250—27)

The present invention relates to electrolytic devices and more particularly to electrolytic condensers having novel and quite unique characteristics.

It is a known phenomenon that when the voltage applied to the electrolytic condensers exceeds certain limits, which as a rule approximately corresponds to the maximum forming voltage, a spark discharge occurs at the film of the filmed electrode (or filmed electrodes) of the condenser, and at the same time the leakage current, which up to this "sparking voltage" is of a low value, sharply increases.

This sparking voltage of the condenser has been regarded as the limiting voltage, above which the condenser could not be operated. Not only is the sparking accompanied by an objectionable noise, but the sparking greatly damages the film, both due to the mechanico-electrical effect characterizing sparking and because of the great heat development taking place directly in the vicinity of the film. The mechanism of sparking, as is well known, is the successive building up of high voltages and subsequent discharges across the spark-gap, which in the present instance is formed between the electrolyte and the film or the underlying metallic surface.

For the above reasons electrolytic condensers heretofore could operate only at a voltage falling below the sparking voltage.

While to some extent, because of their well-known self-healing properties, electrolytic condensers can withstand, without detriment, transient voltages, which exceed their sparking voltage, such is only the case as long as such over-voltages are infrequent and of exceedingly short duration, for instance of the order of a fraction of a second. In such cases no substantial heat development can take place and no substantial damage to the film is caused, and the small deteriorations of the film so caused, can be repaired by the self-healing action of the condenser.

However, in any application which an electrolytic condenser is called upon to stand a voltage exceeding its normal operating voltage for periods of a few minutes or even a few seconds (or rapidly succeeding over-voltages of even shorter duration), the condenser has to be designed for this high voltage.

For instance, as will be more fully discussed later on, in radio sets, certain electrolytic condensers operate normally at about 250 to 300 volts; however, for a period of a few seconds after the set has been turned on, these condensers have to stand voltages of 450 to 500 volts.

In the past such condensers had to be designed for these higher, short-duration voltages, which meant that they had to be formed at the higher voltages.

However, the formation of a 500 volt condenser is considerably costlier than that of a 300 volt condenser. Furthermore, as is well known, the capacity per unit of surface area decreases roughly, proportionally with the forming voltage. Thus a given electrode surface has about $$\frac{500}{300}$$

or about 1.66 times as great a capacity when formed at 300 volts, than when formed at 500 volts. The over-all dimensions of the condenser, and to a great extent its cost, increase in a similar manner for higher voltage condensers.

The condensers according to our invention have the unique characteristic of altogether lacking a sparking voltage. Similarly to standard condensers, they do exhibit a sharp increase of the leakage current, when the operating voltage exceeds a given value, which usually closely corresponds to the maximum forming voltage, but this increase of current is not accompanied by sparking, nor by a substantial local heating up of the film surface. Or in other words, there is no breaking-down of the film at a large number of individual points as is characteristic of spark discharge, but merely the blocking action or insulating resistance of the film drops down uniformly to a value considerably lower than that which it possesses below this critical voltage.

Consequently the film can stand, without being damaged, a voltage exceeding this critical value for any length of time, and even if such a higher voltage is applied for several hours to the condenser and the condenser be ultimately damaged, this is because of the high current passing the condenser unduly heating up the condenser as a whole. If the condenser is to normally stand such over-voltage for quite extended periods, this can be taken care of by a more ample design of the whole condenser, whereby, however, only a comparatively small part of the above advantages obtained by the lower forming voltage, need to be sacrificed.

The process used in the formation of these electrolytic condensers of unique properties, is that described in detail in our copending application Ser. No. 743,468 filed September 10, 1934 of which the present application is a continuation in part. The process described in said application, however, is not limited to the manufacture of these special types of condensers.

As has been fully described in said application, the electrode or electrodes of the condensers are subjected to a two-step forming process, each forming step being a rapid formation step, such rapid formation being fully described in the copending applications to Preston Robinson, Ser. No. 548,270 and Ser. No. 741,493 Patents Nos. 2,057,314 and 2,057,315, respectively, dated October 13, 1936.

According to the process described in our above application, in the first forming step the electrode is formed in an alkaline electrolyte and in the second step in an acidic electrolyte. In the first step the formation takes place by immersing into the electrolyte successive unfilmed portions of the electrode and applying thereto immediately the maximum forming voltage. This voltage, for instance, for condensers of which the critical voltage is 300 volts, will be about 300 volts, although under certain circumstances the forming voltage may vary to some extent from such critical voltage. In the second step, the forming voltage is preferably the same as in the first step, but it is not altogether necessary to gradually immerse the electrode as the electrode is already filmed. As a rule the second forming step requires about 15 to 30 minutes. This time, however, is not critical.

We shall describe our invention on hand of a specific example and in connection with a so-called wet electrolytic condenser for radio filter circuits, for which it is especially important. However, it should be well understood that our invention is broadly applicable to various types of electrolytic condensers.

In the drawing forming part of the specification:

Figure 1:
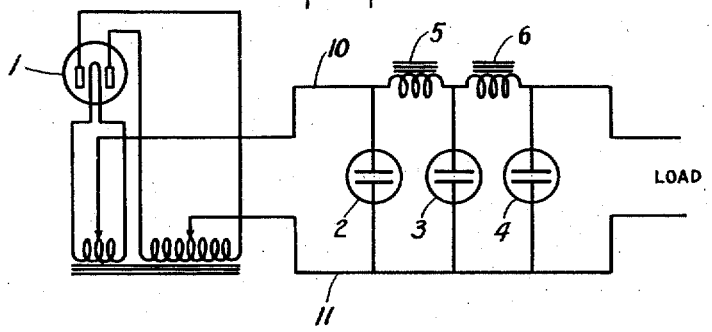
Figure 1 is a schematic diagram showing a filter circuit of a radio receiving set utilizing condensers of our invention.

The filming electrode of the condenser consists of a suitable filming material, for instance of aluminum, tantalum, zirconium, etc. Aluminum, because of its good film-forming properties, easy workability, and low cost, is the most widely used filming metal, and we shall describe our invention with reference to aluminum electrodes.

Both formation steps of our invention preferably, but not necessarily, take place before the assembly of the condensers, and usually a plurality of electrodes are formed simultaneously.

In the first forming step the electrode is immersed in an alkaline electrolyte which preferably comprises as ionogen an alkaline salt of a weak acid, for instance, borax, sodium-phosphate, etc. The solution used is preferably a very dilute aqueous solution of such ionogen. For condensers to be formed at 300 volts we may use, for instance, a solution comprising 2 ounces of borax to 3 gallons of water.

The electrodes are gradually immersed in the electrolyte with the immediate application of the full forming voltage, for example to about 300 volts. Thereby, as has been fully described in the copending applications of Preston Robinson Ser. No. 548,270 and Ser. No. 741,493 the film forms almost instantaneously on successive unfilmed portions of the electrode as they immerge into the electrolyte.

This formation takes place at extremely high current densities, which, together with the high voltage, cause an exceedingly high electrostatic equivalent pressure at the film and this high pressure and rapid formation form a very dense and unhydrated oxide film on the electrode. The temperature of the forming bath in this step should not exceed about 50° C.

A specific characteristic of this forming step, as has been described in detail in our above said application, is that contrary to usual forming processes, there is no chemical reaction outside of the film formation, i. e., the usual production of reaction products in the electrolyte, for instance of aluminum oxide and boric acid, is entirely absent.

The film formed in this step, has a density which is greater than the density of the aluminum on which it is formed, and because of this, electrodes, especially those having corrugated or etched surfaces, when so formed have a tendency of having on their surface minute unfilmed portions or voids. One of the purposes of the second step of formation is to cover such voids with a film which is less dense, more fibroid and elastic.

The second forming step consists in immersing the filmed electrodes into an acid electrolyte comprising, for instance, for 300 volt condensers, 1 lb. borax, 4 lbs. boric acid, 6 gals. water, the forming electrolyte preferably having a temperature of 80° C. or more. Again, the above referred to rapid formation process is preferably used; other weak acids as phosphoric, citric, tartaric acid with or without the addition of salts of a weak acid may also be used.

In this second forming step the aluminum oxide film reacts at its surface with the acidic constituent of the electrolyte.

The filming electrode so formed is then assembled into a condenser with a suitable electrolyte, usually an aqueous solution of a weak acid and/or the salt of a weak acid, whereby the salt of the weak acid does not need to be the salt of the acid used. Such weak acids are, for instance, boric acid, phosphoric acid, citric acid, tartaric acid, etc., and the salts used are generally alkaline metal or ammonium salts of such weak acids. The pH of the final electrolyte should be preferably lower than the pH of the electrolyte used in one of the forming steps, as a rule that of the first forming step.

The other electrode of the condenser may form the container, and is preferably a chromium-plated aluminum can, as described in U. S. Patent No. 1,938,464 to Preston Robinson.

The advantages of our novel condenser will be described on hand of a typical example:

Figure 1 is a schematic circuit diagram of the power supply of a radio receiving set. The regular A. C. lighting current is transformed to the proper voltage and then rectified and filtered to supply the plate current for the tubes of the set. The rectifier 1 is shown as a full wave rectifier, the input side of which is connected to the transformer winding 20.

The leads 10 and 11 supply the rectified and smoothened current to the plate circuits of the tubes.

The filter system provided between the rectifier and the output consists of two choke coils 5 and 6, connected in series in lead 10 and of three condensers 2, 3 and 4. Of these condenser 2 is connected across leads 10 and 11 directly behind the rectifier; condenser 3 is connected across these leads between choke coils 5 and 6; and condenser 4 is connected across the leads 10 and 11 in the rear of choke coil 5. We shall consider primarily the condensers 2 and 3:

The output or load of the rectifier which consists of the sum of the plate currents of the tubes of the radio set is in many of the sets of the order of 100 milliamps, whereas the normal output voltage is in normal operation usually 250 to 300 volts.

The inherent characteristics of the rectifiers most widely used are such, that their voltage drop decreases with increasing load. For instance, in the normal vacuum type of rectifier tubes at zero load, the voltage drop across the tube is about 450 to 500 volts, whereas at 100 milliamps it is about 250 to 300 volts.

As is well known, the plate current through the tubes of the set only starts to flow when the cathode of the respective tubes has been brought to their proper electron-emitting temperature. In modern sets using indirectly-heated cathodes, the time required for the cathodes to attain their full electron-emitting temperature is usually of the order of 10 to 25 seconds. Consequently when a radio receiving set is started, practically no current flows through the rectifier and thus a high voltage drop occurs in the rectifier and the same high voltage exists across the condenser 2.

For this reason, as has been more fully explained before, the condensers used for this purpose, had to be made in the past for 450 or 500 volts, in spite of the fact that in normal operation they operate only at 250 to 300 volts.

On the other hand, condensers according to the invention, formed to 250 or 300 volts, can be employed for this purpose without any damaging of the condenser. Thereby initially when the set is switched on, a leakage current of considerable magnitude flows through the condenser, for a 16 mfd. condenser formed according to our invention at 300 volts, this current being at 450 volts of the order of 40–50 milliamps. However, as the radio tubes gradually assume their electron-emitting temperature, and the plate current starts to flow, the rectifier load increases and its voltage drop, as well as the voltage across the condenser tube decreases. After 10 to 25 seconds the voltage across the condenser is reduced to about 250 to 300 volts, and the leakage current through the condenser decreases to a small value, which is of the order of a fraction of a milliampere.

In the specific example both condensers 2 and 3 have been formed at 300 volts, condenser 2 having 8 mfd. and condenser 3 16 mfd. capacity. When the set is switched on a voltage of about 450 volts is applied across condenser 2 and passes therethrough a current of about 23 milliamps, and a voltage of 410 volts is applied across condenser 3 and passes therethrough a current of about 40 milliamps. Gradually the voltage across these condensers drops below 300 volts and the leakage current drops down to a negligible value.

Figure 2:
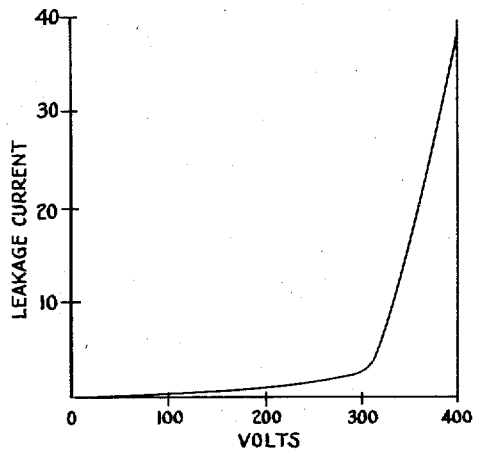
Fig. 2 is a graph illustrating the voltage-leakage current characteristic of our novel condensers.

Fig. 2 shows the leakage current as function of the voltage for a condenser formed at 300 volts according to our invention.

It should be well understood that our invention is not limited to wet electrolytic condensers, nor to condensers used in filter circuits, but can also be applied to so-called "dry" electrolytic condensers, as well as to A. C. condensers.

Therefore we do not wish to be limited to the application and example described, but desire the appended claims to be construed as broadly as permissible in view of the prior art.

What we claim is:

1. In combination an electric circuit and an electrolytic condenser, said condenser being formed at a voltage corresponding to the voltage which it has to stand in normal operation in said circuit and being adapted to stand for extended time intervals a voltage exceeding considerably said normal voltage without deleterious influence to the condenser.

2. In a variable impedance load device including tubes which heat up in operation, a power supply for said device comprising an alternating current source and a rectifier, filtering means on the output side of said rectifier, said filtering means including an electrolytic condenser having a filmed electrode formed for the voltage to which the condenser is subjected in normal operation, said condenser being adapted to withstand without deleterious effect the over-voltages applied thereto during the heating up of the tubes.

3. In a variable impedance load device, a power supply for said device comprising an alternating current source and a rectifier, filtering means on the output side of said rectifier, said filtering means including an electrolytic condenser having a filmed electrode formed for the voltage to which the condenser is subjected in normal operation and when the impedance of said device is low, said condenser being adapted to withstand for extended time intervals without deleterious effect the over-voltages applied thereto when the impedance of said device is high.

4. An electric filter circuit comprising an electrolytic condenser formed at a maximum voltage substantially equal to that which the condenser has to stand in normal operation in said filter circuit, said condenser when subjected in said circuit to voltages considerably exceeding the normal operating voltage, substantially increasing its leakage current without accompanying sparking phenomenon.

5. In the operation of a radio receiving set having receiving tubes and a filter circuit containing an electrolytic condenser having a filmed electrode, the method of energizing the filter circuit comprising the steps of applying across the condenser during the heating up of the receiving tubes a voltage greatly exceeding the maximum film-forming voltage of the electrode while passing through the condenser a greatly increased leakage current without causing sparking of the condenser, and reducing said condenser voltage below said maximum film-forming voltage when the receiving tubes have reached their normal heating temperature.

PRESTON ROBINSON.
JOSEPH L. COLLINS.